June 19, 1962 M. D. GABRIEL 3,039,618
RACK

Filed May 12, 1960 2 Sheets-Sheet 1

Melvin D. Gabriel,
Inventor.
Koenig and Pope,
Attorneys.

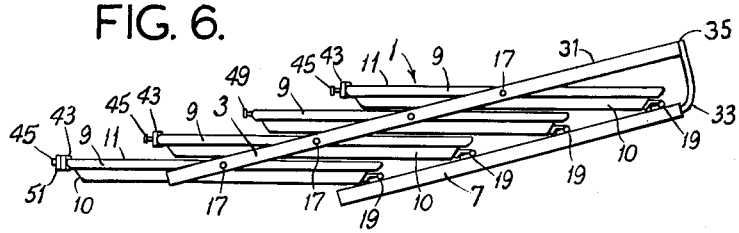
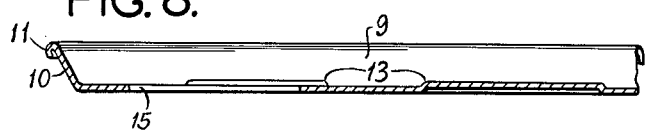
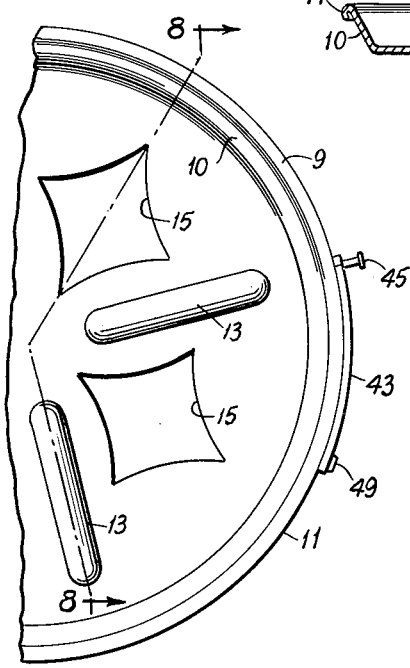
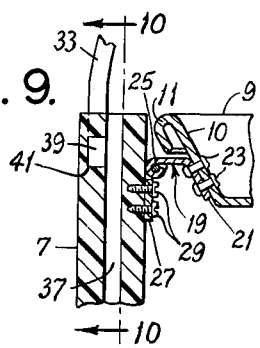
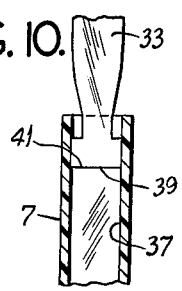
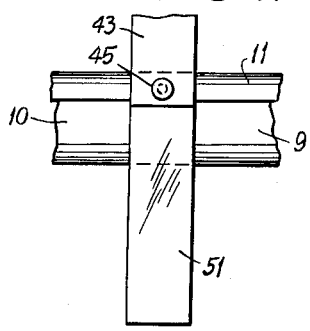

United States Patent Office 3,039,618
Patented June 19, 1962

3,039,618
RACK
Melvin D. Gabriel, 8326 Whitewater Drive,
Berkeley, Mo.
Filed May 12, 1960, Ser. No. 28,773
9 Claims. (Cl. 211—132)

This invention relates to racks, and more particularly to a collapsible rack for use in carrying and transporting pies.

Among the several objects of the invention may be noted the provision of a rack which may be readily erected or collapsed and maintained in an erected or collapsed condition; the provision of such a rack in which a plurality of pies may be safely stored or transported; the provision of a rack of this type from which any pie carried thereby may be readily removed as desired; and the provision of a rack of this character which is of simple and economical construction. Other objects and features will be in part apparent and in part pointed out hereinafter.

The invention accordingly comprises the constructions hereinafter described, the scope of the invention being indicated in the following claims.

In the accompanying drawings, in which one of various possible embodiments of the invention is illustrated, FIG. 1 is a view in elevation of a rack of the present invention;

FIG. 6 is a view in elevation of the rack of the invention in a collapsed condition;

FIG. 7 is a partial plan view of a tray per se of the rack of the invention;

FIG. 8 is a fragmentary section taken on line 8—8 of FIG. 7;

FIG. 9 is an enlarged section taken on line 9—9 of FIG. 1;

FIG. 10 is an enlarged fragmentary section taken on line 10—10 of FIG. 9; and

FIG. 11 is an enlarged fragmentary section taken on line 11—11 of FIG. 2.

Corresponding reference characters indicate corresponding parts throughout the several views of the drawings.

Figure 1:
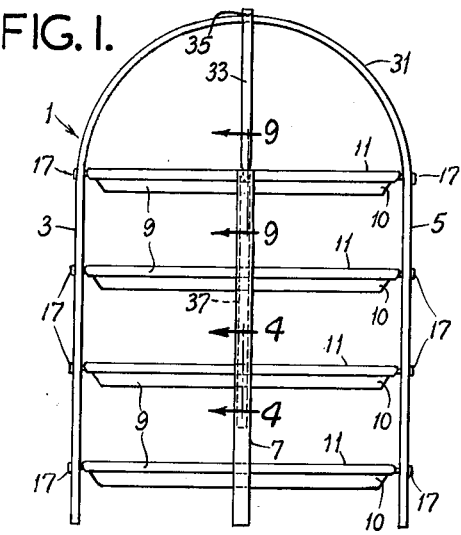
Figure 2:
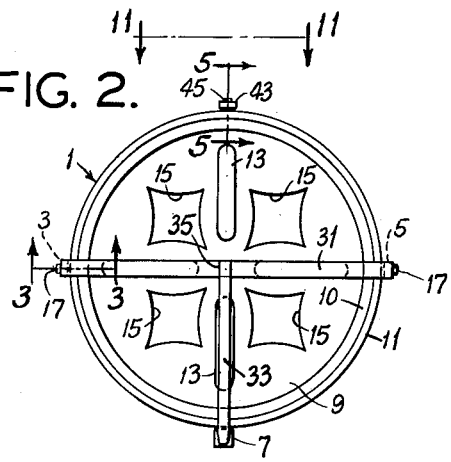
FIG. 2 is a top plan view of the rack of FIG. 1.
Figure 3:
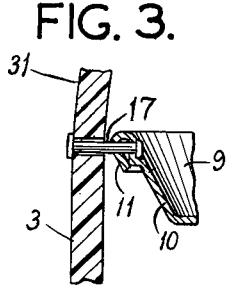
FIG. 3 is an enlarged fragmentary section taken on line 3—3 of FIG. 2.
Figure 5:
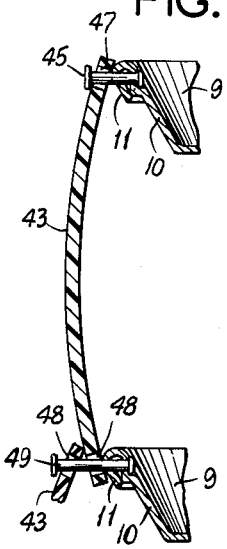
FIG. 5 is an enlarged fragmentary section taken on line 5—5 of FIG. 2.
Figure 4:
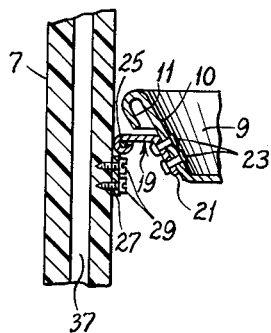
FIG. 4 is an enlarged fragmentary section taken on line 4—4 of FIG. 1.

Referring now to the drawings, a rack of the present invention generally designated 1 is shown to comprise first, second and third posts designated 3, 5 and 7, respectively, and a series of circular trays 9 carried by the posts. As shown, posts 3, 5 and 7 are rectangular in cross section and may be formed of any suitable material. Preferably, they are formed of a rigid plastic material.

The trays 9 may also be formed of any suitable material such as, for example, plastic or a metal such as aluminum. Each of trays 9 conforms generally to the shape of a conventional pie plate but is preferably only one-half as deep as a conventional pie plate. As shown, trays 9 have tapered walls 10 and a relatively thick rim 11 extending around the top thereof. The trays 9 are formed with a series of upwardly extending ridges 13 on the bottom thereof. Also, each of trays 9 has a series of ventilation openings 15 in the bottom thereof disposed between the ridges 13. Each tray 9 is of such size and depth that it will readily receive a standard pie plate (not shown) therein, the latter resting on the ridges 13 and having the rim thereof extending above rim 11 so that it may be readily removed from tray 9.

Posts 3 and 5 are located on diametrically opposite sides of trays 9, and are pivotally secured to trays 9 by pins 17 which extend through posts 3 and 5 into the rims 11 of the trays 9. Each of trays 9 is thus swingable relative to posts 3 and 5 on an axis extending diametrically across the trays between posts 3 and 5. Post 7 is located midway between posts 3 and 5 and is hingedly connected to trays 9 by hinges generally designated 19. Each of hinges 19 includes a plate 21 secured to trays 9 by fasteners 23, a hinge pin 25 and a plate 27 secured to post 7 by screws 29. The trays 9 are thus hingedly connected to post 7 for swinging movement thereof relative to post 7 on axes at the edges of the trays and in the planes of the trays and at right angles to the axes extending between posts 3 and 5. It is also to be observed that the axes defined by hinge pins 25 are tangent to the trays.

At 31 is indicated a U-shaped handle constituted by an integral extension of posts 3 and 5. Handle 31 and posts 3 and 5 are molded in one piece preferably of a rigid plastic material. Extending between the center of handle 31 and post 7 is a brace or reinforcing member 33 composed of a flexible or semi-flexible plastic material. Reinforcing member 33 is secured to handle 31 at its upper end as indicated at 35, and may be telescopically retracted within guide slot 37 in post 7 when the rack is collapsed (see FIG. 6). The lower end of reinforcing member 33 is provided with a T-shaped rib 39 which snaps into notch 41 located adjacent but outside guide slot 37 at the upper end of post 7. Reinforcing member 33 may thus be releasably locked in an erected position as shown in FIG. 1 to support handle 31.

The uppermost and two lowermost trays 9 each carry a strut designated 43 pivoted thereon at a point located diametrically opposite from post 7. As shown, one end of each strut 43 is pivotally connected to the uppermost and two lowermosts trays 9 at this point by means of a pin 45 extending through an opening 47 in the strut and fixed in rim 11 of each tray. Struts 43 are preferably made of a flexible or semi-flexible plastic material and are of curved shape conforming to that of rim 11. The other end of each strut 43 has an opening 48 therein for releasably receiving a pin 49 secured to rim 11 at a point spaced from pins 45 (see FIG. 7). As shown, struts 43 may be swung from a position wherein each strut is releasably held in engagement with rim 11 by pins 45 and 49, respectively, to a position wherein it is releasably held by a pair of pins 45 and extends between two trays 9. If desired, flexible struts 43 may be of a length shorter than the distance between pins 45 and 49 or the distance between a pair of pins 45 on two trays 9 and stretched a sufficient amount to be releasably held between these points as described. At 51 is indicated a foot pivotally secured by lowermost pin 45 to the lowermost tray 9, and extending down therefrom directly opposite post 7.

The rack 1 may be readily knocked down from the erected position shown in FIG. 1 wherein posts 3, 5 and 7 extend vertically and trays 9 extend horizontally to a collapsed position as shown in FIG. 6. In use, the rack may be transported or carried about in a collapsed form. When ready for use as a pie carrier, the rack 1 is first erected by pulling posts 3 and 5 to an upright position whereby trays 9 are each swung relative to posts 3, 5 and 7 to a position in which each lies directly above or below another. This also moves handle 31 to an upright position whereby reinforcing member 33 is pulled from guide slot 37 in post 7 and upon being fully extended therefrom, rib 39 at the lower end of strut 43 is snapped into notch 41 to lock the reinforcing member 33 in an erected condition to support handle 31. Foot 51 is swung into a vertical position on pin 45 to serve as a base supporting the side of the rack opposite post 7. The rack is then loaded by placing pie plates in each of trays 9 through the openings between the trays and posts 3 and 5 opposite post 7. Next, struts 43 are swung from a position wherein they engage the rim 11 of the trays 9 to a position wherein they extend between a pair of trays 9 and are releasably held by a pair of pins 45. This further braces the rack and prevents the removal of pie plates therefrom. The rack, thus loaded, may then be carried or transported about. Each pie may be easily removed from the rack simply by swinging the particular strut 43 closing access to the desired pie back to a position wherein it engages the rim 11 of the tray 9 on which the strut is pivoted.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. A collapsible rack comprising first, second and third posts and a series of trays carried by the posts one above another, the first and second posts being located on opposite sides of the trays and pivotally secured thereto, each tray thereby being swingable relative to the first and second posts on an axis extending across the tray, the third post being hingedly connected to the trays for swinging movement of each tray relative to the third post on an axis at the edge of the tray and in the plane of the tray, said posts extending vertically and said trays supported thereby extending horizontally when said rack is erected, and releasable means on a plurality but less than all of said trays for holding said trays against collapse when erected.

2. A collapsible rack as set forth in claim 1 including a handle extending from the upper end of said first post to the upper end of said second post and integral with said posts.

3. A collapsible rack as set forth in claim 2 including releasable means for holding said handle against collapse when erected.

4. A collapsible rack comprising first, second and third posts and a series of circular trays carried by the posts one above another, the first and second of said posts being located on opposite sides of said trays and being pivotally secured thereto, each tray thereby being swingable relative to the first and second posts on a diameter of the tray, the third post being hingedly connected to said trays for swinging movement of each tray relative to said third post on axes tangent to the trays, a handle extending from the upper end of said first post to the upper end of said second post and integral with said posts, a reinforcing member extending between said handle and said third post and releasably holding said handle against collapse when erected and releasable means for holding said trays against collapse when erected, said posts extending vertically and said trays supported thereby extending horizontally when said rack is erected.

5. A collapsible rack as set forth in claim 4 wherein said reinforcing member is telescopically retractable into said third post.

6. A collapsible rack as set forth in claim 4 wherein said releasable means is constituted by providing certain of said trays with a strut pivoted thereon at the edge of one of said trays at a point opposite said third post, each of said struts being adapted to be swung from a position wherein it engages the edge of one of said trays to a position wherein it extends between two of said trays.

7. A collapsible rack as set forth in claim 6 wherein one end of each of said struts is pivotally secured to the edge of one of said trays and the other end of each of said struts is releasably secured to the edge of one of said trays.

8. A collapsible rack as set forth in claim 4 including a foot extending from the lowermost tray and pivotally secured thereto at a point opposite said third post.

9. A collapsible rack as set forth in claim 4 wherein each of said trays is formed with a plurality of upwardly extending ridges and a plurality of openings in the bottom thereof.

References Cited in the file of this patent

UNITED STATES PATENTS

| | | |
|---|---|---|
| 2,005,566 | Schwabe | June 18, 1935 |
| 2,148,548 | Gregory | Feb. 28, 1939 |
| 2,883,064 | McKenzie | April 21, 1959 |

FOREIGN PATENTS

| | | |
|---|---|---|
| 273,272 | Switzerland | Jan. 31, 1951 |